US011671512B2

(12) United States Patent
Otenko

(10) Patent No.: US 11,671,512 B2
(45) Date of Patent: Jun. 6, 2023

(54) CONCATENATING REACTIVE PUBLISHER FOR USE WITH A MICROSERVICES OR OTHER COMPUTING ENVIRONMENT

(71) Applicant: Oracle International Corporation, Redwood Shores, CA (US)

(72) Inventor: Oleksandr Otenko, Winnersh (GB)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/512,319

(22) Filed: Oct. 27, 2021

(65) Prior Publication Data

US 2022/0141301 A1 May 5, 2022

Related U.S. Application Data

(60) Provisional application No. 63/108,143, filed on Oct. 30, 2020.

(51) Int. Cl.
*H04L 67/55* (2022.01)
*H04L 67/60* (2022.01)
*H04L 67/562* (2022.01)
*H04L 67/566* (2022.01)
*H04L 67/133* (2022.01)

(52) U.S. Cl.
CPC .......... *H04L 67/55* (2022.05); *H04L 67/562* (2022.05); *H04L 67/566* (2022.05); *H04L 67/60* (2022.05); *H04L 67/133* (2022.05)

(58) Field of Classification Search
CPC ..... H04L 67/55; H04L 67/566; H04L 67/562; H04L 67/60
See application file for complete search history.

(56) References Cited

U.S. PATENT DOCUMENTS

| 2006/0047666 | A1* | 3/2006 | Bedi | G06F 16/958 |
| 2011/0099232 | A1* | 4/2011 | Gupta | H04L 67/566 |
| | | | | 709/206 |
| 2019/0104015 | A1* | 4/2019 | Moore | H04L 67/141 |

OTHER PUBLICATIONS

Udemy: "Java Reactive Programming—Combining Multiple Sources Of Flux / Mono", Mar. 27, 2020, 14 pages.

(Continued)

*Primary Examiner* — Wing F Chan
*Assistant Examiner* — Billy H Ng
(74) *Attorney, Agent, or Firm* — Tucker Ellis LLP

(57) ABSTRACT

In accordance with an embodiment, described herein is a system and method for providing a constant memory footprint concatenating reactive publisher, for use with microservices or reactive programming environments. A Publisher provides a Subscriber with a Subscription that supports requests of an amount up to a particular value. The Publisher can keep track of a requested number of items. When concatenating output from multiple Publishers, the switch between the output of one Publisher, and that of the next, may involve keeping track of new states. The described approach supports the requirement to maintain an amount of requests, by using request counters to maintain the necessary state, heed backpressure, and deliver requests as soon as they are issued by the Subscriber owning the Subscription.

15 Claims, 16 Drawing Sheets

(56) References Cited

OTHER PUBLICATIONS

European Patent Office, International Searching Authority, International Search Report and Written Opinion for International Patent Application No. PCT/US2021/057081 dated Mar. 11, 2022, 13 pages.

Helidon, "ConcatPublisher.java"; retrieved from <https://github.com/helidon-io/helidon/blob/helidon-3.x/common/reactive/src/main/java/io/helidon/common/reactive/ConcatPublisher.java> on Jan. 26, 2023; 4 pages.

Helidon, "MultiConcatArray.java"; retrieved from <https://github.com/helidon-io/helidon/blob/helidon-3.x/common/reactive/src/main/java/io/helidon/common/reactive/MultiConcatArray.java> on Jan. 26, 2023; 7 pages.

Karnow, D; "Reimplement ConcatPublisher + TCK tests", Mar. 2, 2020; retrieved from <https://github.com/helidon-io/helidon/commit/000d470d3dd716828d67830d43c2a0c6adcbb3c4> on Jan. 30, 2023; 12 pages.

Karnow, D; "[Reactive] Reimplement Concat with varargs (comment)", May 18, 2020; retrieved from <https://github.com/helidon-io/helidon/pull/1815> on Jan. 30, 2023; 2 pages.

Karnow, D; "[Reactive] Reimplement Concat with varargs", May 19, 2020; retrieved from <https://github.com/helidon-io/helidon/commit/28cb3e8a34bda691c035d21f90b6278c6a42007c> on Jan. 26, 2023; 8 pages.

Helidon, "Interface Multi<T>"; retrieved from <https://helidon.io/docs/v2/apidocs/io.helidon.common.reactive/io/helidon/common/reactive/Multi.html> on Jan. 30, 2023; 28 pages.

Helidon, "Interface Flow.Publisher <T>"; retrieved from <https://docs.oracle.com/en/java/javase/11/docs/api/java.base/java/util/concurrent/Flow.Publisher.html> on Jan. 30, 2023; 2 pages.

Helidon, "Class ConcatPublisher<T>"; retrieved from <https://helidon.io/docs/v2/apidocs/io.helidon.common.reactive/io/helidon/common/reactive/ConcatPublisher.html> on Jan. 30, 2023; 2 pages.

\* cited by examiner

CONCATENATING REACTIVE PUBLISHER FOR USE WITH A MICROSERVICES OR OTHER COMPUTING ENVIRONMENT

CLAIM OF PRIORITY

This application claims the benefit of priority to U.S. Provisional Application titled "CONSTANT MEMORY FOOTPRINT CONCATENATING REACTIVE PUBLISHER FOR USE WITH A MICROSERVICES OR OTHER COMPUTING ENVIRONMENT", Application No. 63/108,143, filed Oct. 30, 2020; which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments described herein are generally related to cloud computing and other computing environments, software development, microservice architectures, and reactive computing, and are particularly directed to systems and methods for providing a constant memory footprint concatenating reactive publisher in such environments.

BACKGROUND

Microservice environments can present a software application as a collection of loosely-coupled services that are independently deployable and communicate with one another over a network. The microservice approach can be used, for example, to develop software applications to be provided in cloud computing environments as cloud services. In such environments, microservices can be used to provide elasticity, and to make efficient use of computational resources.

Reactive computing environments generally support the use of publishers and subscribers that use onComplete signals. Such environments allow a developer to construct pipelines in a declarative fashion, and achieve high concurrency with a small number of threads, due to the ability to control the progress of the computation without recourse to blocking operations. However, care must be taken to accommodate ABA problems due to the reuse of values or objects in a concurrent setting, where an update may not notice a change of value from A to B and back to A again.

SUMMARY

In accordance with an embodiment, described herein is a system and method for providing a constant memory footprint concatenating reactive publisher, for use with microservices or reactive programming environments.

In accordance with an embodiment, a Publisher provides a Subscriber with a Subscription that supports requests of an amount up to a particular value (Long.MAX_VALUE). The Publisher can keep track of a requested number of items. When concatenating output from multiple Publishers, the switch between the output of one Publisher, and that of the next, is not atomic, and may involve keeping track of new states, e.g., when one Publisher has ceased to produce items, and the next Publisher has not yet started to produce items.

The amount of state, and coordination between transitions is non-trivial, and may involve error conditions and cancellations. The described approach supports the requirement to maintain an amount of requests up to Long.MAX_VALUE, by allowing the system to extend the range into negative values, and by using atomic request counters to maintain the necessary state, heed backpressure, and deliver requests as soon as they are issued by the Subscriber owning the Subscription, which reduces the need for buffering.

DETAILED DESCRIPTION

As described above, microservice architectures can present a software application as a collection of loosely-coupled services that are independently deployable and communicate with one another over a network. The microservice approach can be used, for example, to develop software applications to be provided in cloud computing environments as cloud services. In such environments, microservices can be used to provide elasticity, and to make efficient use of computational resources.

Software development frameworks such as Helidon assist in the development of microservices. For example, Helidon offers Standard Edition (SE) and MicroProfile (MP) programming models or environments, each of which include a collection of software libraries that support features such as configuration, security, or web server functionality; and provide a software developer with a foundation upon which to create a microservice.

Generally described, Helidon alleviates the need for the software developer to program according to a specific tooling or deployment model, and enables the running of microservices without the need for an application server. Helidon libraries can interoperate with other software development, deployment, and/or monitoring tools such as, for example, Docker, Kubernetes, Prometheus, or OpenTracing.

Microservices Environments (Helidon)

Figure 1:
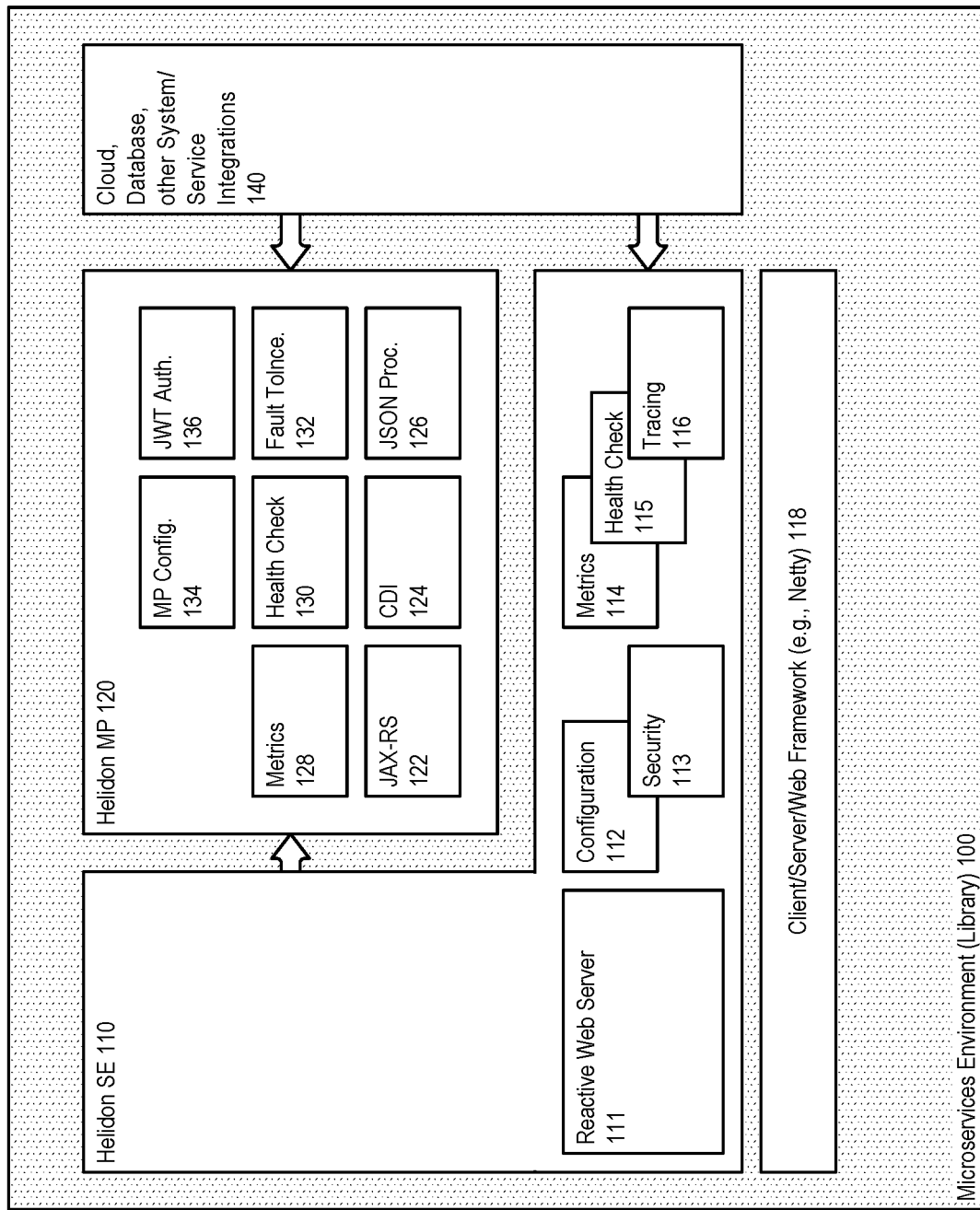
FIG. 1 illustrates an example microservices environment that provides a software development framework, in accordance with an embodiment.

FIG. 1 illustrates an example microservices environment that provides a software development framework, in accordance with an embodiment.

As illustrated in FIG. 1, in accordance with an embodiment, a Helidon microservices environment 100 offers both Standard Edition (SE) and MicroProfile (MP) programming models or environments.

In accordance with an embodiment, a Helidon SE environment 110 can include various libraries, APIs, or other components, such as, for example, a reactive web server 111, which provides an asynchronous and reactive API for creating web applications; a configuration API 112, which provides a Java API to load and process configuration properties in key/value form into a config object which an application can then use to retrieve config data; and a security component 113, which provides authentication, authorization, and outbound security; and can also include metrics 114, health check 115, and tracing 116 or other components.

In accordance with an embodiment, a Helidon MP environment 120 can include various libraries, APIs, or other components, such as, for example, JAX-RS 122, JSON-P 126, CDI 124, metrics 128, health check 130 fault tolerance 132, MicroProfile configuration 134, and JWT authentication 136 components. In accordance with an embodiment, the web server can be provided by a non-blocking client/server/web framework 118, such as, for example, Netty. The microservices environment can also enable interactions with cloud, database, or other systems or services 140.

Figure 2:
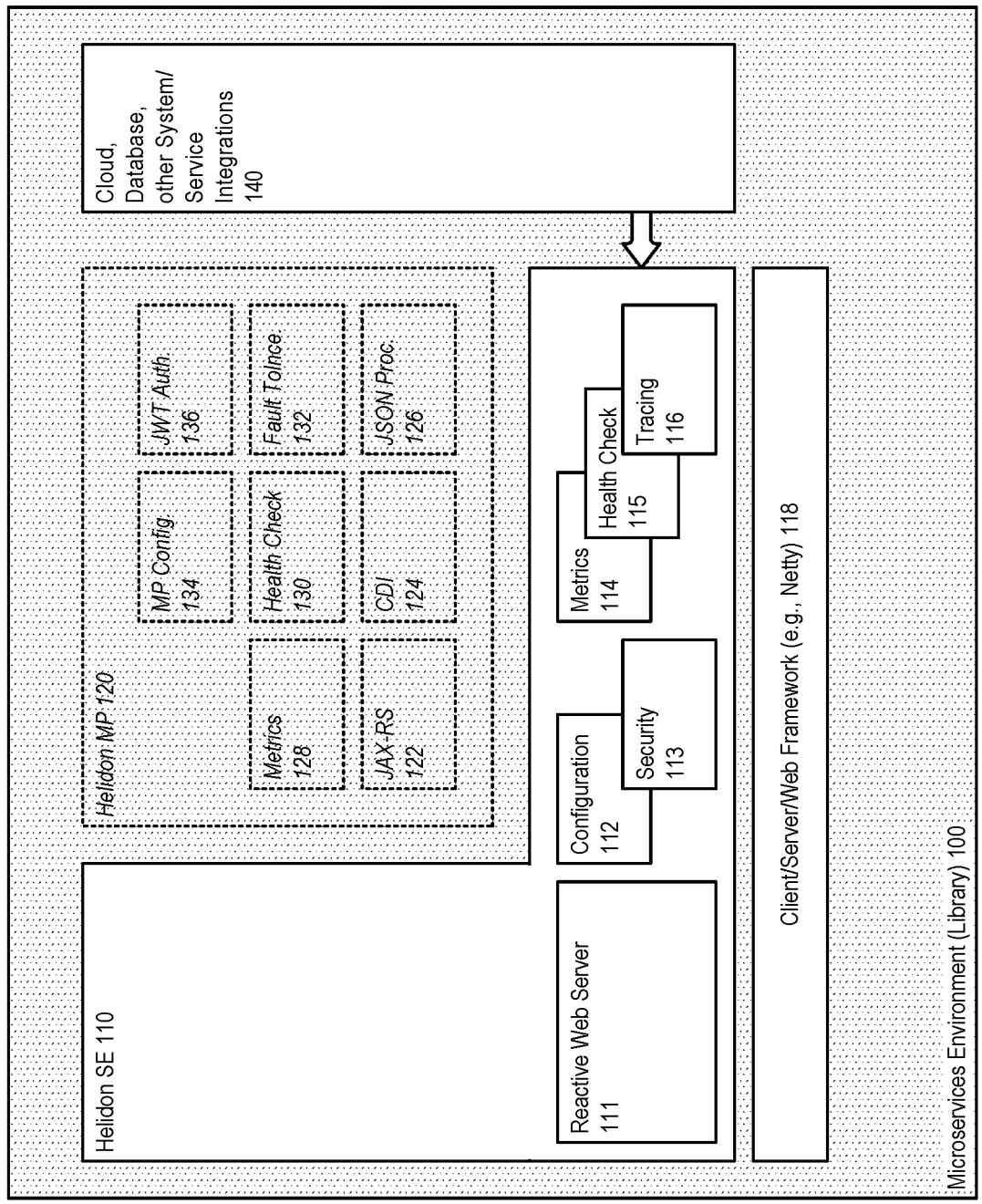
FIG. 2 illustrates an example Helidon SE microservices environment, in accordance with an embodiment.

FIG. 2 illustrates an example Helidon SE microservices environment, in accordance with an embodiment.

As illustrated in FIG. 2, in accordance with an embodiment, a Helidon SE environment supports a functional programming style that uses the web server, security and configuration components directly; provides the software developer with transparency and control; and supports Java features such as reactive streams, and asynchronous and functional programming. A Helidon SE environment provides a framework by which the software developer can build lightweight reactive microservices.

Figure 3:
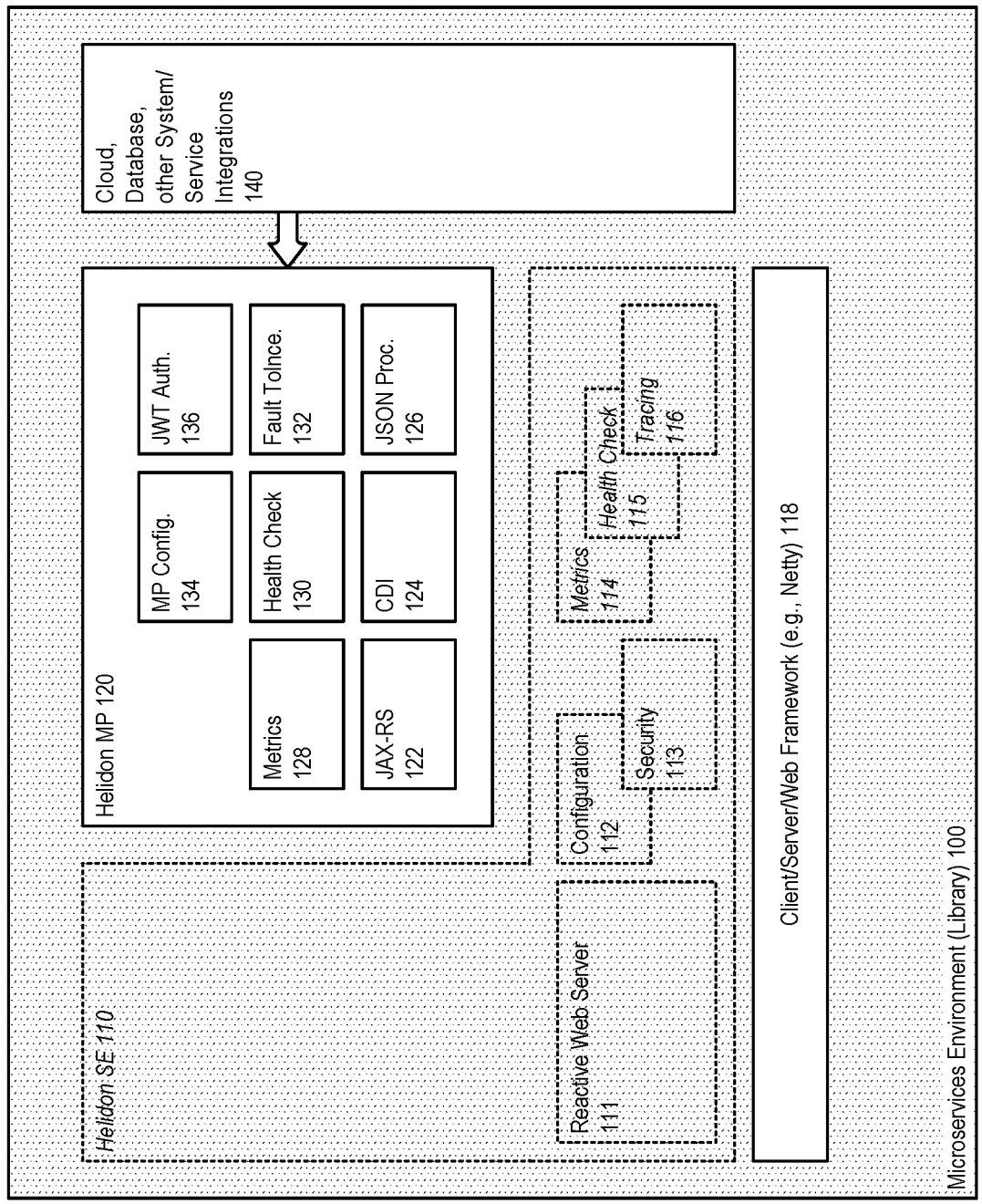
FIG. 3 illustrates an example Helidon MP microservices environment, in accordance with an embodiment.

FIG. 3 illustrates an example Helidon MP microservices environment, in accordance with an embodiment.

As illustrated in FIG. 3, in accordance with an embodiment, a Helidon MP environment supports a declarative programming style, through the use of a MicroProfile family of APIs built on top of the Helidon libraries. A MicroProfile definition (for example, as specified by the Eclipse MicroProfile project) can be used to support application portability across multiple MicroProfile runtimes.

In accordance with an embodiment, a microservices environment can present a software application as a collection of loosely-coupled services that are independently deployable and communicate with one another over a network. For example, a Helidon microservices environment can support the use of a remote procedure call (e.g., gRPC) framework or component, which enables (client and/or server) applications to communicate within the microservices environment, to build connected systems.

Figure 4:
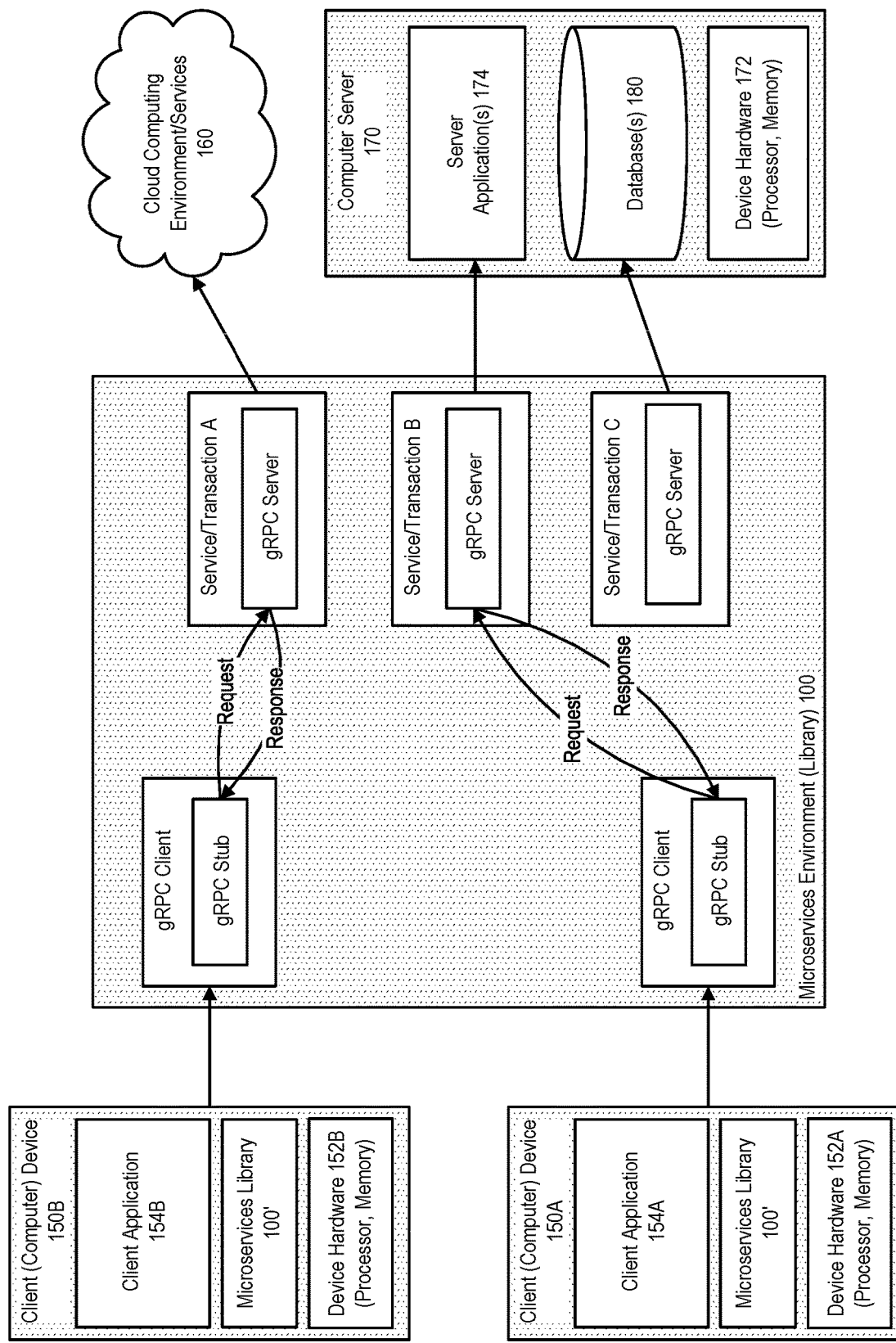
FIG. 4 illustrates communication in a microservices environment, in accordance with an embodiment.

FIG. 4 illustrates communication in a microservices environment, in accordance with an embodiment.

The example shown and described in FIG. 4 is provided for purposes of illustrating an example of one type of communication supported by a microservices environment; in accordance with other embodiments and examples, other types of communication can be supported.

As illustrated in FIG. 4, in accordance with an embodiment, a remote procedure call framework enables definition of a service and methods that can be called remotely. A server or service can handle calls from a client, via a local object (stub) at the client that enables a client application to directly call a method on a server application as if it were a local object. The server/service implements methods to handle client calls, including decoding incoming requests, executing service methods, and encoding service responses. The local object (stub) implements the same methods as the service, wrapping the parameters for the call in an appropriate protocol buffer message type, which is then provided as requests to the server.

In accordance with an embodiment, a microservices library enables access by client applications to communicate with microservices or interact with cloud, database, or other systems or services, for purposes of accessing data, processing transactions, or performing other operations associated with those systems or services.

Reactive Environments

In a traditional message-driven environment, a producer sends messages to a consumer as they become available; however if the consumer is not able to process the messages in real time then the received messages are stored in a buffer, which can lead to performance issues.

In accordance with an embodiment, a microservices environment can provide a reactive environment, for example a reactive engine or reactive messaging API, for use with activities such as transaction processing, asynchronous messaging channels, or reactive streams.

Figure 5:
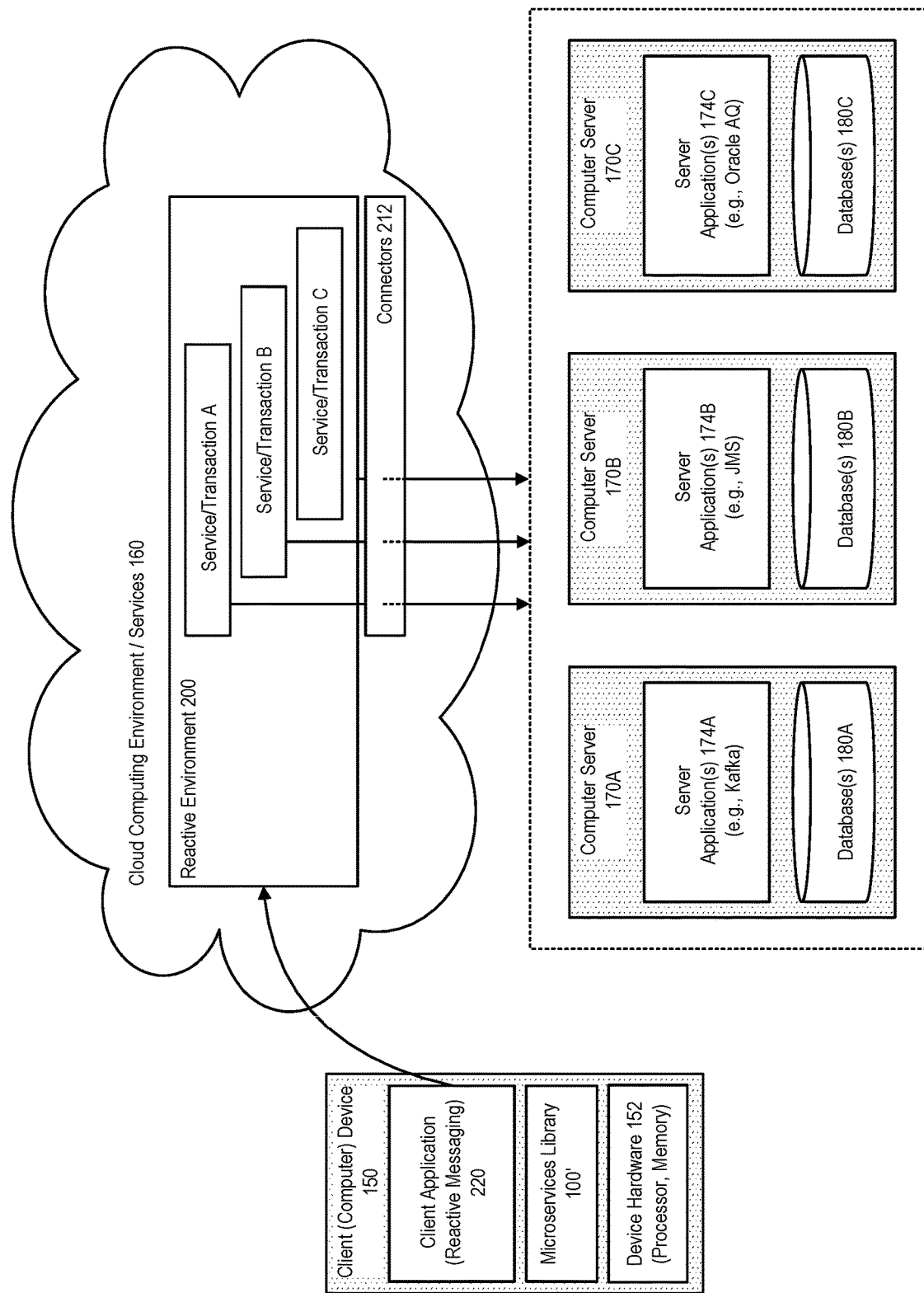
FIG. 5 illustrates the use of a reactive environment in a microservices environment, in accordance with an embodiment.

FIG. 5 illustrates the use of a reactive environment in a microservices environment, in accordance with an embodiment.

The example shown and described in FIG. 5 is provided for purposes of illustrating an example of one type or usage of a reactive environment as supported by a microservices environment; in accordance with other embodiments and examples, other types and usages of reactive environments can be provided.

As illustrated in FIG. 5, in accordance with an embodiment, the reactive environment 200 enables a client application 220 to communicate reactively with services, as publishers and subscribers, within the microservices environment. Connectors 212 can be used to provide publishers and subscribers with access to reactive messaging channels, or to provide support for the use of reactive messaging with Kafka, JMS, or other type of messaging, message queueing, or stream processing environments. The reactive environment enables asynchronous stream processing with non-blocking back pressure—a subscriber informs a publisher as to how much data it can process, and the publisher sends an appropriate amount of data as requested by the subscriber.

Figure 6:
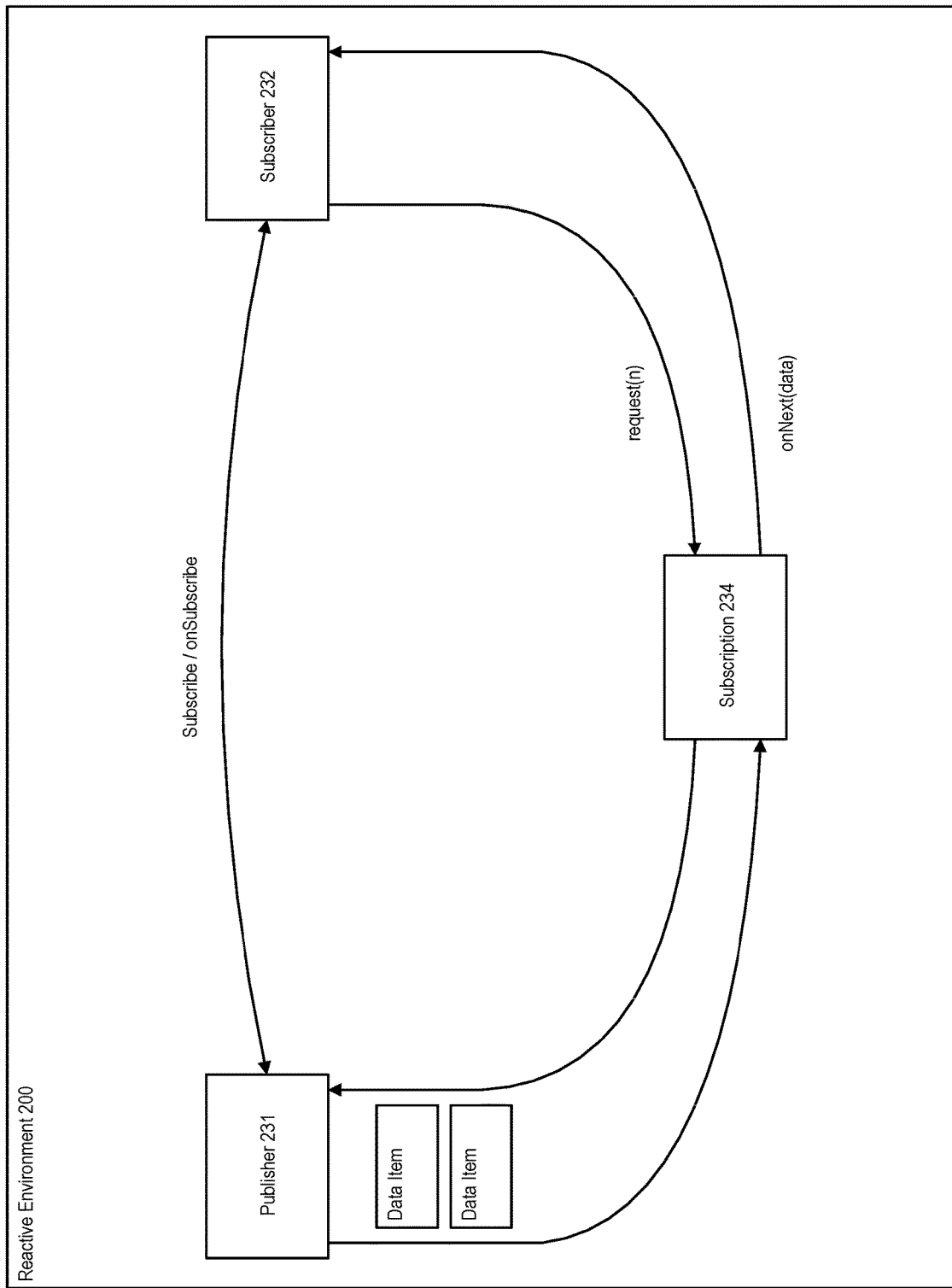
FIG. 6 further illustrates the use of a reactive environment, in accordance with an embodiment.

FIG. 6 further illustrates the use of a reactive environment, in accordance with an embodiment.

As illustrated in FIG. 6, in accordance with an embodiment, a publisher 231 (referred to herein in some examples as a Publisher) operates as a producer of data, according to the demand requested by its subscribers. A subscriber 232 (referred to herein in some examples as a Subscriber) operates as a consumer of the data produced by a publisher. A subscription (referred to herein in some examples as a Subscription) 234 defines the relationship between a subscriber subscribing to a publisher, and provides a mechanism by which the subscriber can request more data (from the publisher). In accordance with an embodiment, a processor (referred to herein in some examples as a Processor) can be provided that operates as a message/data processing stage and, via subscriptions, both as a subscriber and a publisher.

Figure 7:
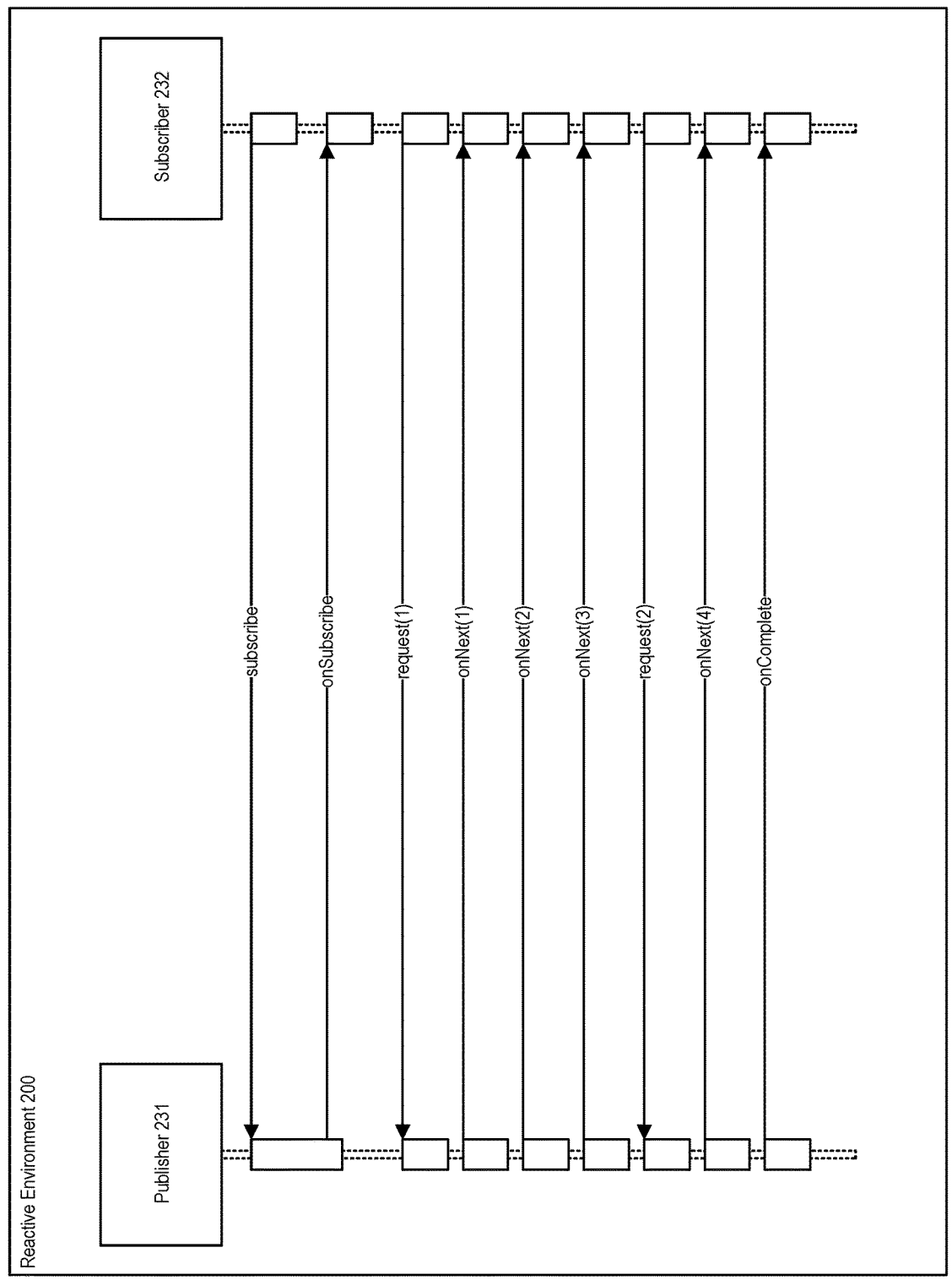
FIG. 7 further illustrates the use of a reactive environment, in accordance with an embodiment.

FIG. 7 further illustrates the use of a reactive environment, in accordance with an embodiment.

As illustrated in FIG. 7, in accordance with an embodiment, when a subscriber is passed to a publisher, the subscriber receives a call on method onSubscribe(Subscription), but will not immediately begin to receive data items or other events. Data items are only received by the subscriber when it calls method request (long) within its subscription, which signals to the publisher a demand for more data. A subscriber can receive data through invocation of a method Subscriber.onNext, which is invoked with the next item, and can be called a number (n) times as determined by a long value passed on the method request(long) of its subscription. A method Subscriber.onError( ) can be invoked when an error occurs while processing the stream. A method Subscriber.onComplete( ) can be invoked when there is no further data to be processed. In the case of both an onError( ) and onComplete( ) event being invoked, then no new data will be emitted by the publisher, even if the method request(long) is called again.

Constant Memory Footprint Concatenating Reactive Publisher

Modern software benefits from organizing computations in asynchronous pipelines with backpressure. This allows a developer to construct pipelines in a declarative fashion, and achieve high concurrency with a small number of threads—all due to the ability to control the progress of the computation without recourse to blocking operations.

Reactive computing environments generally support the use of publishers and subscribers that use onComplete signals. Such environments allow a developer to construct pipelines in a declarative fashion, and achieve high concurrency with a small number of threads, due to the ability to control the progress of the computation without recourse to blocking operations. However, care must be taken to accommodate ABA problems due to the reuse of values or objects in a concurrent setting, where an update may not notice a change of value from A to B and back to A again. In accordance with an embodiment, described herein is a system and method for providing a constant memory footprint concatenating reactive publisher, for use with microservices or reactive programming environments.

For example, in Reactive Java, asynchronous pipelines are combined from Publishers, Subscribers, and Processors. It is important to be able to construct pipelines that combine output from multiple Publishers into a single strictly ordered flow, and conform to a Publisher API. This requires careful orchestration of state transitions, and heed backpressure from downstream components, to ensure both timely arrival of items, and quiescence, when the downstream is not ready. This is especially difficult to achieve in a lock-free manner, and even more difficult to do with a constant (O(1)) memory footprint.

In accordance with an embodiment, described herein is a system and method for providing a constant memory footprint concatenating reactive publisher, for use with microservices or reactive programming environments.

In accordance with an embodiment, a Publisher provides a Subscriber with a Subscription that supports requests of an amount up to a particular value (Long.MAX_VALUE). The Publisher can keep track of a requested number of items. When concatenating output from multiple Publishers, the switch between the output of one Publisher, and that of the next, is not atomic, and may involve keeping track of new states, e.g., when one Publisher has ceased to produce items, and the next Publisher has not yet started to produce items.

The amount of state, and coordination between transitions is non-trivial, and may involve error conditions and cancellations. The described approach supports the requirement to maintain an amount of requests up to Long.MAX_VALUE, by allowing the system to extend the range into negative values, and by using atomic request counters to maintain the necessary state, heed backpressure, and deliver requests as soon as they are issued by the Subscriber owning the Subscription, which reduces the need for buffering.

In accordance with an embodiment, technical advantages of the described approach include, for example, minimizing the memory footprint and points that require coordination. The memory footprint is reduced by delegating all error condition management to inner Publishers: as long as the inner Publishers are used one after another, it is possible to simply forward their onError signal downstream—no further coordination is needed.

Figure 8:
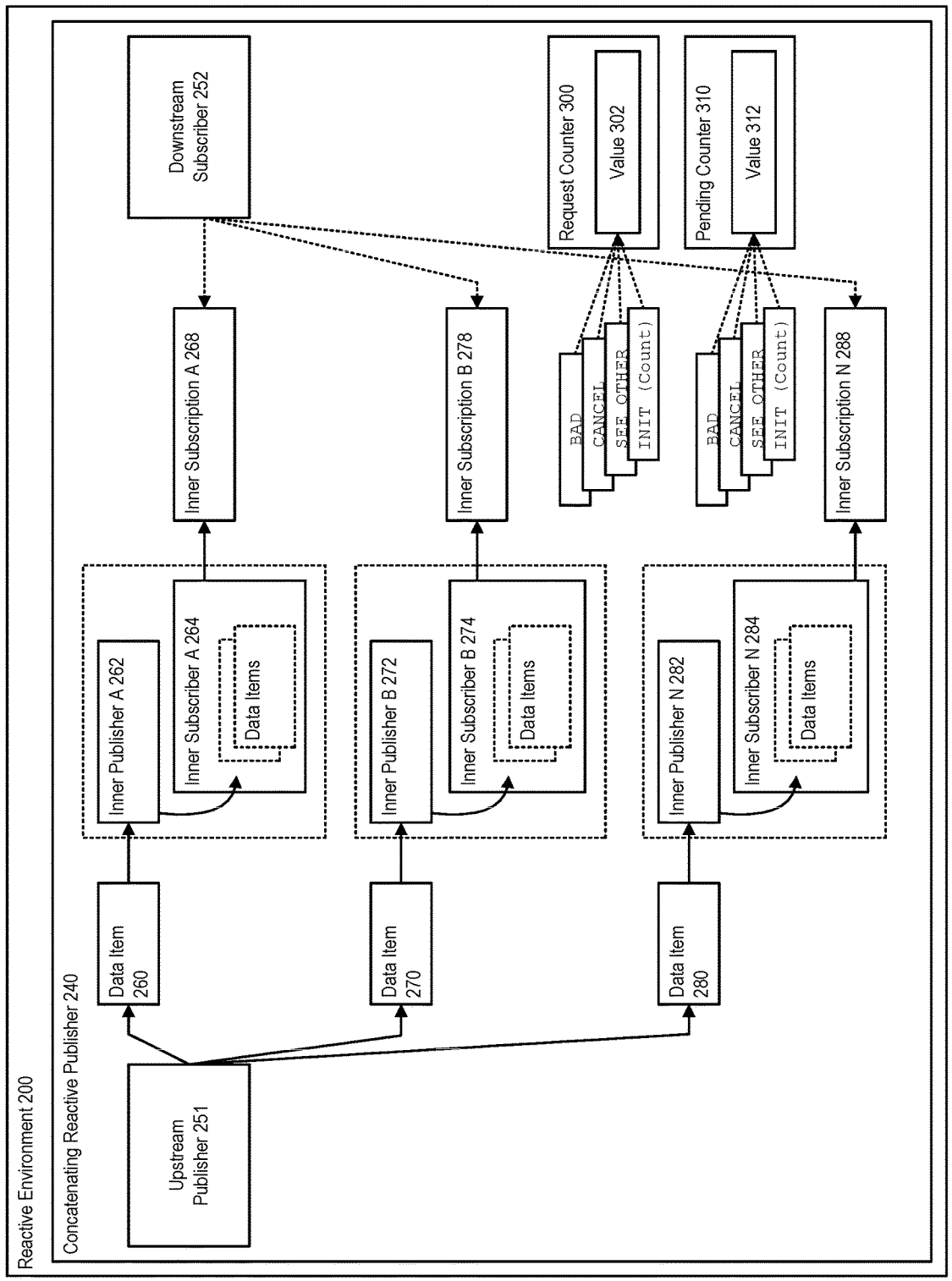
FIG. 8 illustrates a system that provides a constant memory footprint concatenating reactive publisher, in accordance with an embodiment.

FIG. 8 illustrates a system that provides a constant memory footprint concatenating reactive publisher, in accordance with an embodiment.

As illustrated in FIG. 8, in accordance with an embodiment, in accordance with various embodiments, the system includes or operates a bounded recursion process 300 for use with an upstream publisher (Publisher) 251 that publishes data items 260, 270, 280 via a plurality of inner publishers A 262, B 272, N 282, each of which is associated with an inner subscriber 264, 274, 284 respectively, and which provide data via inner subscription 268, 278, 288 as a stream of events for use by a downstream subscriber (Subscriber) 252.

As illustrated, a concatenating reactive publisher 240 can use a request counter 300, the value 302 of which can be used to indicate a transition from A-B-A and as a generation counter. The system also provides a pending counter 310, the value 312 of which is used to keep track of the requests coming from the downstream subscriber. Both the pending counter and request counter can be in any of 4 states: BAD, CANCEL, SEE_OTHER, or INIT (counting). Generation counting and request counting are combined to avoid creating new small objects and contain the memory usage.

Figure 9:
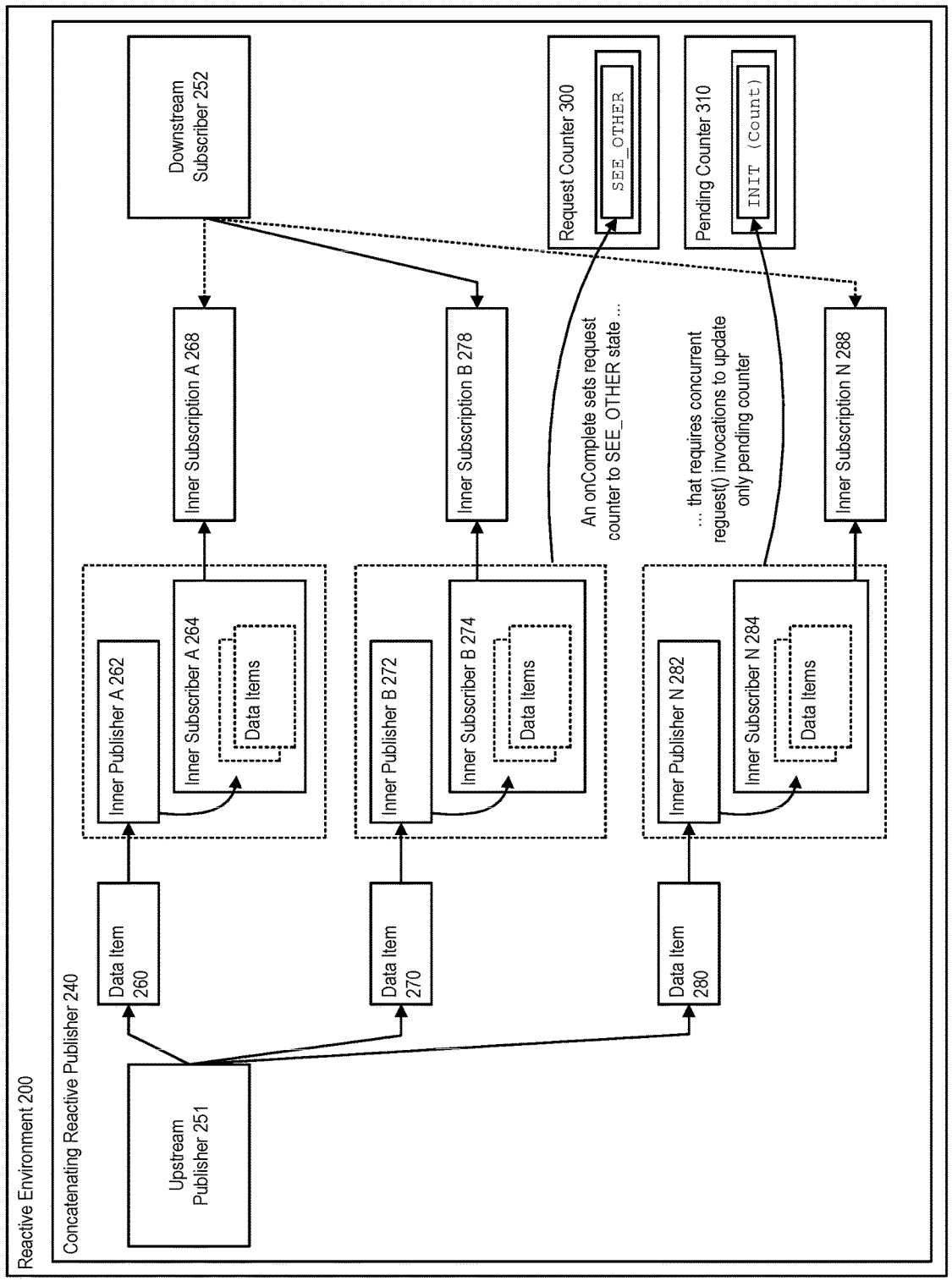
FIG. 9 further illustrates a system that provides a constant memory footprint concatenating reactive publisher, in accordance with an embodiment.

FIG. 9 further illustrates a system that provides a constant memory footprint concatenating reactive publisher, in accordance with an embodiment.

In accordance with an embodiment, the described approach enables the array of inner Publishers to be drained in turn, one after the other. During that time, the system keeps track of requests coming from Downstream; and delegated much of the handling of transitions, or errors, to the inner Publishers (illustrated in FIGS. 10-15 as 330, 340, 350) who operate upon those transitions. This allows the system to avoid creating new objects, and minimizes the communication between the inner Publisher (s) and Downstream Subscriber, hence constant memory footprint, while also determining those instances in which the ABA problem can be accommodated In accordance with an embodiment, the described approach offers a non-buffering component that is conformant to the Reactive Java Publisher API with O(1) memory footprint lock-free. Other approaches with two counters may involve discarding one of the counters after disabling it, and allocating a new one in its stead (not constant memory footprint), maintain more state to account for synchronization considerations such as the ABA problem, or make state transitions blocking (not lock-free). In accordance with an embodiment, the described approach supports use of extended range to maintain the necessary additional State.

In accordance with an embodiment, it can be observed that request counter is non-decreasing. The system can modify this condition to make the request counter always increasing when switching from one Publisher to the next. This requires the request count to be extended, in order to allow for the full range of 0 to Long.MAX_VALUE possible requests from downstream. However, since the number of Publishers concatenated this way is not restricted, the system can support concatenation of up to Long.MAX_VALUE−3 Publishers without loss of precision. The additional range is used to always modify the request counter when one Publisher ceases producing items.

In accordance with an embodiment, the described approach supports distinguishing two types of request that allow to guarantee once-and-only-once delivery of good requests, and at-least-once delivery of bad requests In accordance with an embodiment, it can be observed that even with the extension of the range it is possible for the Subscriber to issue sufficiently many requests to exceed even the extended range of the request counter. However, the system must accurately capture the request count only for good requests that do not exceed Long.MAX_VALUE.

After that value is reached, the system does not need to pass the good requests on to any Publisher, as we can always request MAX_VALUE. At the same time, bad requests are required to produce onError events. This can be achieved by atomically transitioning from the current request count to a BAD request value, and delivering this request count to the current Publisher. Unlike the good requests, we are not restricted to request this once and only once, this permits to discover the right Publisher that will deliver the onError event without recourse to additional state management. Typically if errors were generated by intermediate component, it would need to be tracked as additional state, to ensure one and only one onError event is delivered.

Addressing the ABA Problem in Constant Space

In accordance with an embodiment, an ABA problem is the problem of reusing values or objects in a concurrent setting, where an atomic update may not notice a change of value from A to B to A again. In some instances this is addressed by not reusing the objects, so the state never returns from B to A; however this approach leads to new allocations during the program's lifetime.

In accordance with an embodiment, here the objects are reused, keeping the memory footprint constant. The ABA problem is addressed by ensuring the transition from B to A can happen only in carefully managed benign cases. This can be achieved through monotonous increase of Requested counter, so concurrent updates of the counter cannot miss other updates. However, this is not sufficient in this scenario as a few other conditions need tracking, for example: subscription cancellation; error condition signalled by inner Publishers; invalid requests by downstream Subscriber; and switch from one inner Subscription to the next.

Additionally, in presence of inner Publishers, it is necessary to keep track of how many requests that have been issued by downstream Subscriber have not been satisfied by the current inner Publisher, so at the time the next inner Publisher is ready, the unsatisfied amount can be requested from it.

One complex part of the reactive specification is the requirement to handle invalid request from downstream Subscriber by producing onError signals. It is easy to simply delegate invalid requests to the inner Publishers, when they are ready, but it is not possible to do that when switching from one inner Subscription to the next—there is a time when the current inner Subscription is in a terminal state, and the new one has not arrived from the next inner Publisher. If the concatenating Publisher were to issue its own onError events, it would have to ensure these are serialized correctly with respect with the other signals any inner Publisher may be issuing, ensure no further signals are forwarded to downstream Subscriber after onError event is signalled, and any non-terminated Subscription is cancelled. In accordance with the approach described herein, this is addressed by delegating invalid requests to the next inner Publisher.

In accordance with an embodiment, with the choice to delegate all requests and cancellations to the inner Publishers and to forward all signals to downstream Subscriber, it is necessary to ensure backpressure is heeded when switching from one inner Subscription to the next: that is, that all inner Publishers seen as a single stream of onNext signals by downstream Subscriber issue no more onNext events as the Subscriber has issued valid requests. This requires carrying over the number of requests issued to one inner Publisher to the next, minus the number of satisfied requests; and should be achieved without atomic state transitions.

In accordance with an embodiment, the system can observe that each inner Subscription is in one of the following states:

It is safe to issue requests to it.

It is safe to issue requests to it, and safe to carry them over to the next inner Publisher.

It is safe to issue requests to it, but this is futile—the requests must be carried over to the next inner Publisher.

It is safe to issue requests to it, but this is futile—the new requests have no further impact on the signals observed by downstream Subscriber.

It can be observed the following condition holds universally: if we cannot prove the Subscription is terminated, we should issue request to the Subscription that exists before the atomic update to request counter—this is to ensure the "at most once" delivery of signals; if we cannot prove the Subscription will observe the request and deliver a signal, we should issue request to the Subscription that exists after the atomic update to request counter—this is to ensure the "at least once" delivery of signals In accordance with an embodiment, using the first approach ensures no double accounting happens and backpressure is heeded. It is necessary to detect conditions when the Subscription reaches a terminal state, and carry over the unsatisfied requests to the next inner Subscription, if still safe to do so.

In accordance with an embodiment, using the second approach ensures the propagation of cancellation and error signals caused by invalid requests. It is safe to issue cancellation or invalid requests more than once to any inner Subscription—it is safe to allow concurrent cancellations, requests and other routines that may observe this state to ensure the delivery of these signals to the current or any other inner Subscription—issuing these signals cannot result in more than one onError or any other terminal state (e.g., quiescence).

In accordance with an embodiment, distinguishing between the two approaches can be achieved through cooperation between:

An OnSubscribe—being issued by an inner Publisher to signal readiness to serve an inner Subscription.

An onComplete—being issued by an inner Publisher to signal when the inner Subscription has reached a terminal state program order between onComplete from one inner Subscription and the onSubscribe of the next concurrent invocations of request( ) or cancel( ).

In accordance with an embodiment, this is performed through management of two atomic counters: a request counter and a pending counter.

An onComplete sets request and pending counter to a state where it is safe to update either of them: request counter is already in such a state, pending is set to the number of requests that have already been satisfied—this number is not going to be modified concurrently, because the inner Subscription reached a terminal state The onComplete atomically sets request counter to the SEE_OTHER state that requires concurrent request( ) invocations to update only pending counter The onComplete atomically updates pending counter with the number of requests that were not satisfied yet—this is computed from the value of request counter and the number of satisfied requests If any concurrent request( ) invocations occur before setting the request counter to the SEE_OTHER state that requires them to update pending counter, they will update request counter, and issue request to the Subscription that is known to be in a state that is not going to produce any more signals. So it is safe to carry over the number of requests to pending counter later.

In accordance with an embodiment, if any concurrent request( ) invocations occur after setting the request counter to the SEE_OTHER state, but before the next onSubscribe, they will update pending counter, and not interact with any inner Subscription. The later atomic update of pending counter by onComplete keeps track of both the unsatisfied requests, and these concurrent requests.

In accordance with an embodiment, a feature of the described approach is the handling of pending and request counters by onSubscribe. Although the operation performed is effectively the reverse of what onComplete is doing—copy over pending counter to request counter—this is performed in a subtly different manner, the reason for which will become apparent later, when discussing the ABA problem.

An onSubscribe sets a new inner Subscription.

The onSubscribe sets request and pending counter to a state where it is safe to update either of them: pending counter is already in such a state, request counter is set to the current value of pending counter.

The onSubscribe atomically sets pending counter to the SEE_OTHER state that requires concurrent request( ) invocations to update only request counter, and issue request( ) invocation on the current inner Subscription.

The onSubscribe updates request counter if any concurrent updates were made to pending counter between setting the request counter and setting pending counter to the SEE_OTHER state.

The onSubscribe issues the unsatisfied requests to the inner Subscription—this is computed from the state of pending counter and the number of requests that have been satisfied previously—this counter is not being updated concurrently, as the inner Publisher cannot issue onNext before onSubscribe has finished.

If any concurrent invocation of request( ) occurs before setting request counter to pending counter, they will update pending counter and not interact with any inner Subscription. So it is safe to carry over the number of pending requests to the requested counter, and call request( ) of the inner Subscription.

In accordance with an embodiment, if any concurrent invocation of request( ) occurs after setting request counter to the value of pending counter, they will update the request counter, and issue requests directly to the current inner Subscription. There is no need to keep track of these in any special manner. Note however that this is the situation where the ABA problem can occur, if request counters are not managed carefully.

In particular, if the request counter is set to SEE_OTHER by onComplete, and then upon onSubscribe back to the value that is the same as has been seen by onComplete (being temporarily stored in pending counter), then the concurrent request( ) invocation will call request( ) on the inner Subscription is observed before updating request counter, which may be the inner Subscription that existed at the time before onComplete finished. Such requests cannot be satisfied by that inner Subscription, and can be observed by downstream Subscriber as a lack of progress.

In accordance with an embodiment, the system can ensure the value of request counter is not the same, when the inner Subscription changes. This is performed by artificially incrementing the request counter by onComplete, and the counter of satisfied requests by onSubscribe, to keep the backpressure the same as before onComplete.

In addition to this, the system can maintain the range of available backpressure the same by extending request counter range from the required range of 0 to Long.MAX_VALUE to almost double that, by starting request counter from INIT, which is Long.MIN_VALUE+3—so the Publisher must process onComplete INIT times before downstream Subscriber can detect the lack of available backpressure. In modern physical systems this is not possible to achieve, and even the reactive specification treats Long.MAX_VALUE as effectively infinite.

If a concurrent request( ) attempts to issue an invalid request, the ABA problem may still occur, and a benign race condition may happen. If after onSubscribe has set new inner Subscription and has set request counter, such a concurrent request( ) invocation will observe this inner Subscription as it has been set, and forward invalid request to it, which will eventually result in an onError signal, or, if such a Subscription is already in a terminal state, may result in onComplete, which will simply preserve the state of request counter until the next onSubscribe. The onSubscribe will not observe the concurrent request( ) issuing an invalid request, and may issue some valid requests that have not been satisfied. This cannot create more events than is allowed by the reactive specification.

In accordance with an embodiment, it can be observed that the extension of the request counter range allows to detect the change of inner Subscription only up to the time when the counter reaches Long.MAX_VALUE, which is a possibility despite the extension of the range—the downstream Subscriber is not obliged to stop issuing request( ) upon reaching any particular level of backpressure, and may exceed even the extended range—for example, by requesting Long.MAX_VALUE more than once.

In this state the ABA problem reappears—the request counter can be observed to go from Long.MAX_VALUE to SEE_OTHER then to Long.MAX_VALUE again—and the concurrent invocation of request( ) will not be able to detect this, since the counter cannot go on incrementing past Long.MAX_VALUE. However, the proposed design ensures that ABA problem is benign in this case, as explained below.

In accordance with an embodiment, when a concurrent request( ) cannot observe a change of inner Subscription, it may issue request( ) on the wrong inner Subscription—on the inner Subscription that has already reached a terminal state. However, when issuing valid requests, this does not result in a loss of backpressure level. The ABA problem can occur only after an onSubscribe follows an onComplete. Even though the concurrent request may issue request( ) on the quiescent inner Subscription, onSubscribe is going to observe that the request counter is already at Long.MAX_VALUE, and will issue a request of Long.MAX_VALUE on the new inner Subscription, thus retaining the correct level of backpressure.

Event Processing

FIGS. 10-15 illustrate various examples of event processing, in accordance with an embodiment.

Figure 10:
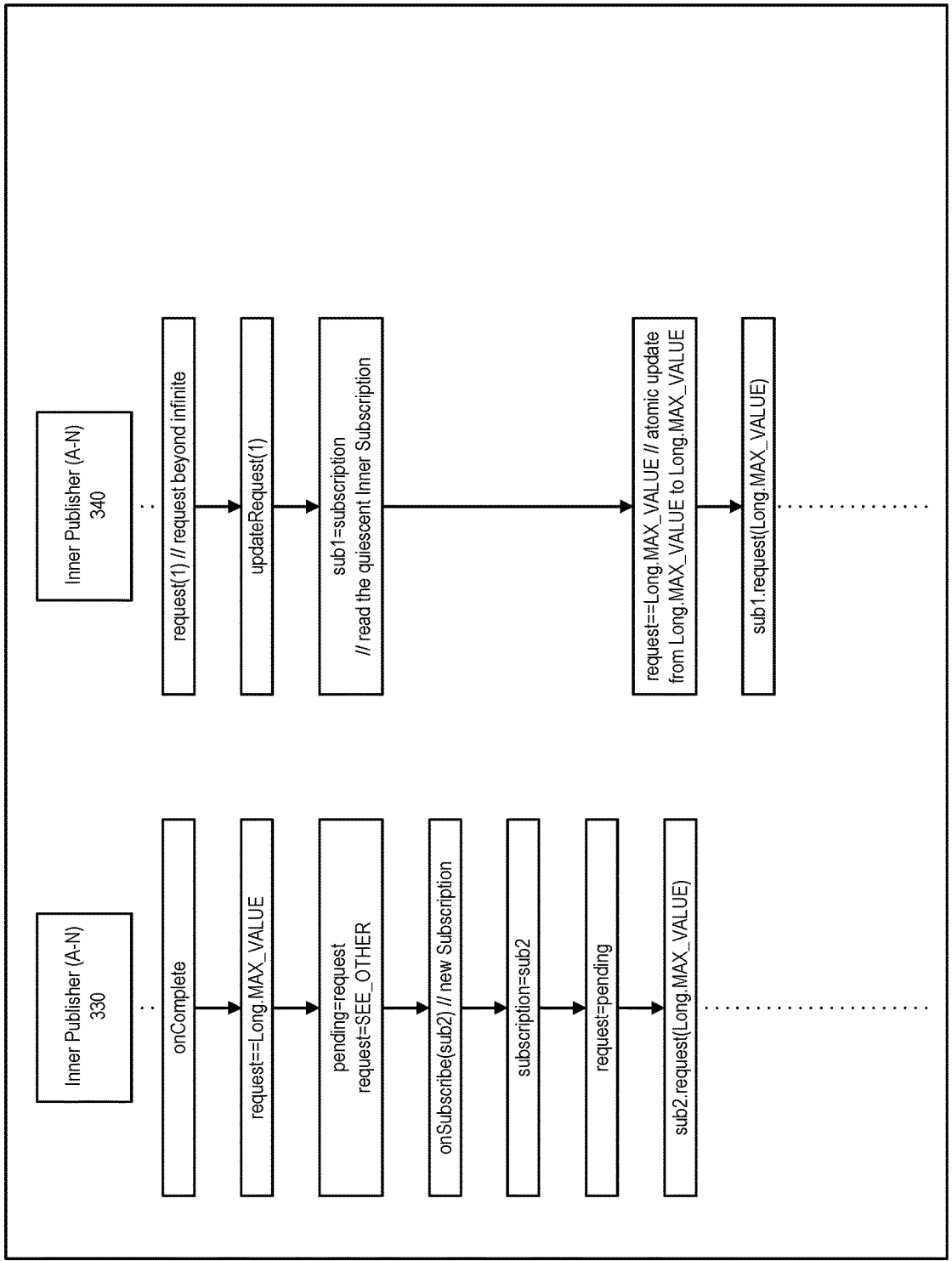
FIG. 10 illustrates an example of event processing, in accordance with an embodiment.

In accordance with an embodiment, by way of example, FIG. 10 illustrates an environment in which the ABA problem does occur, but is benign: onSubscribe issues request to maintain the right amount of backpressure, and issuing request( ) on a quiescent inner Subscription 'sub1' does not result in new events.

Figure 11:
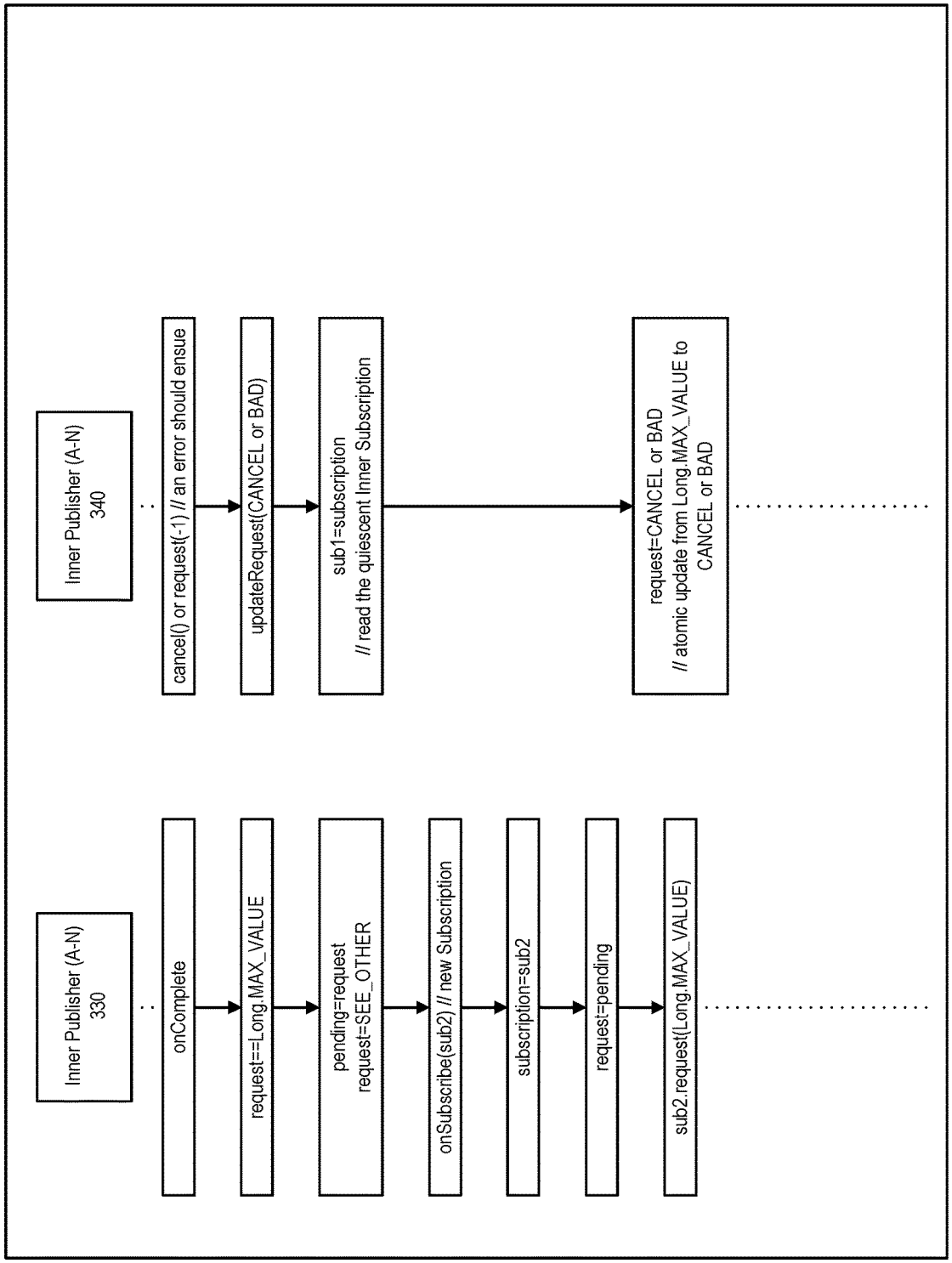
FIG. 11 illustrates an example of event processing, in accordance with an embodiment.

FIG. 11 illustrates the second case where a concurrent request( ) cannot observe a change of inner Subscription, is when an invalid request is passed by downstream Subscriber after having reached Long.MAX_VALUE. In this case it is possible that the onSubscribe issues Long.MAX_VALUE to the new inner Subscription, but the concurrent request( ) may update request counter and issue request( ) to the old (quiescent) inner Subscription that it observed before updating the request counter, were it to follow the normal request procedure:

In accordance with an embodiment, FIG. 11 illustrates an environment in which a concurrent cancel( ) or request( ) may not observe the change of inner Subscription, and result in violating the cancellation or error notification requirements of the reactive Publisher specification, if it followed the protocol of a good request( ) and issued these signals on 'sub1' that it observes before updating request counter. Instead, in this design these specific conditions follow a different path: when cancelling or making an invalid request, it issues these calls on an inner Subscription that it observes after an atomic update of request counter.

Figure 12:
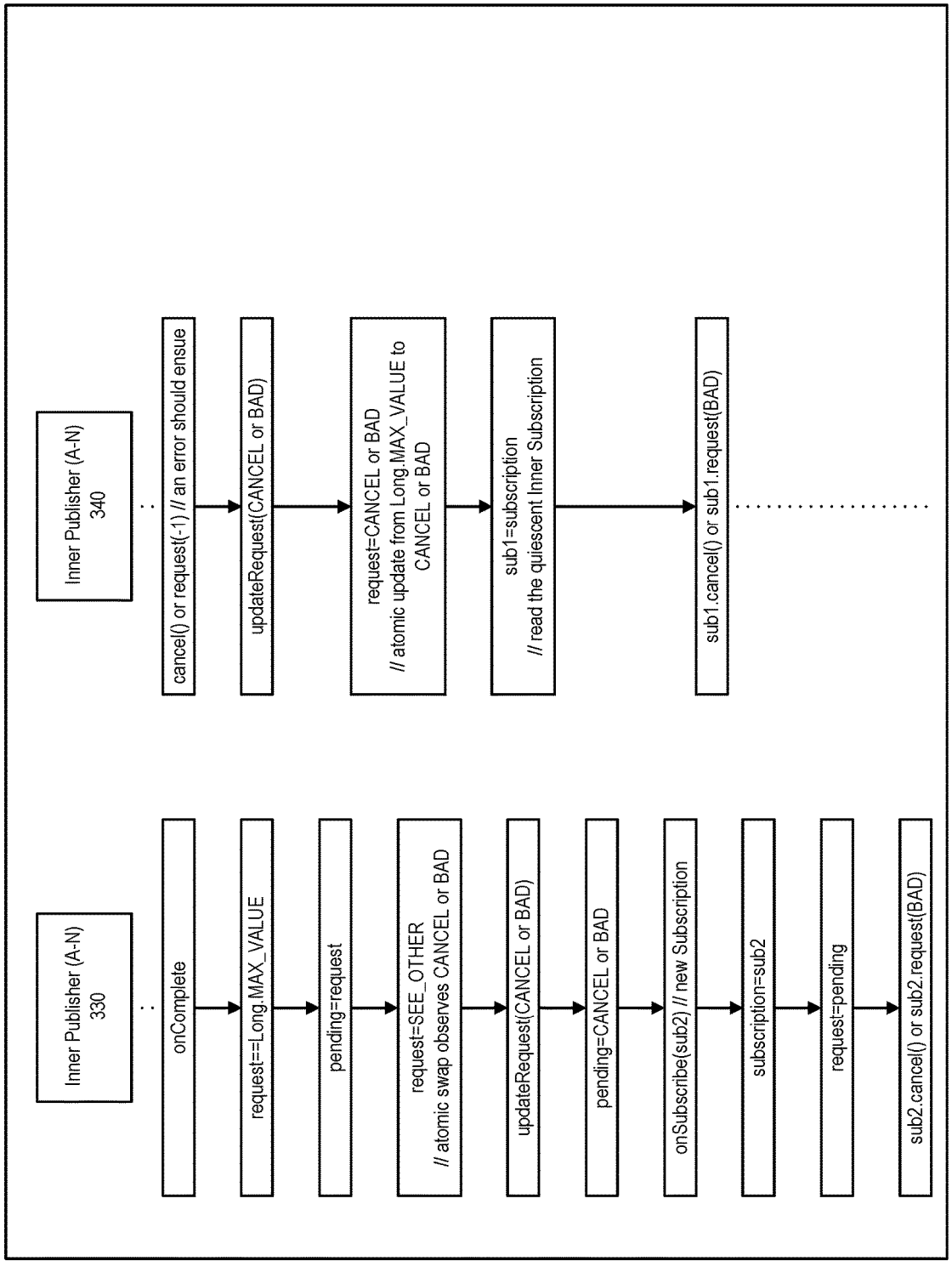
FIG. 12 illustrates an example of event processing, in accordance with an embodiment.

In accordance with various embodiments, possible interleaving of events can include, for example:

As illustrated in FIG. 12, in which the system issues a cancellation or invalid request on a quiescent inner Subscription.

Figure 13:
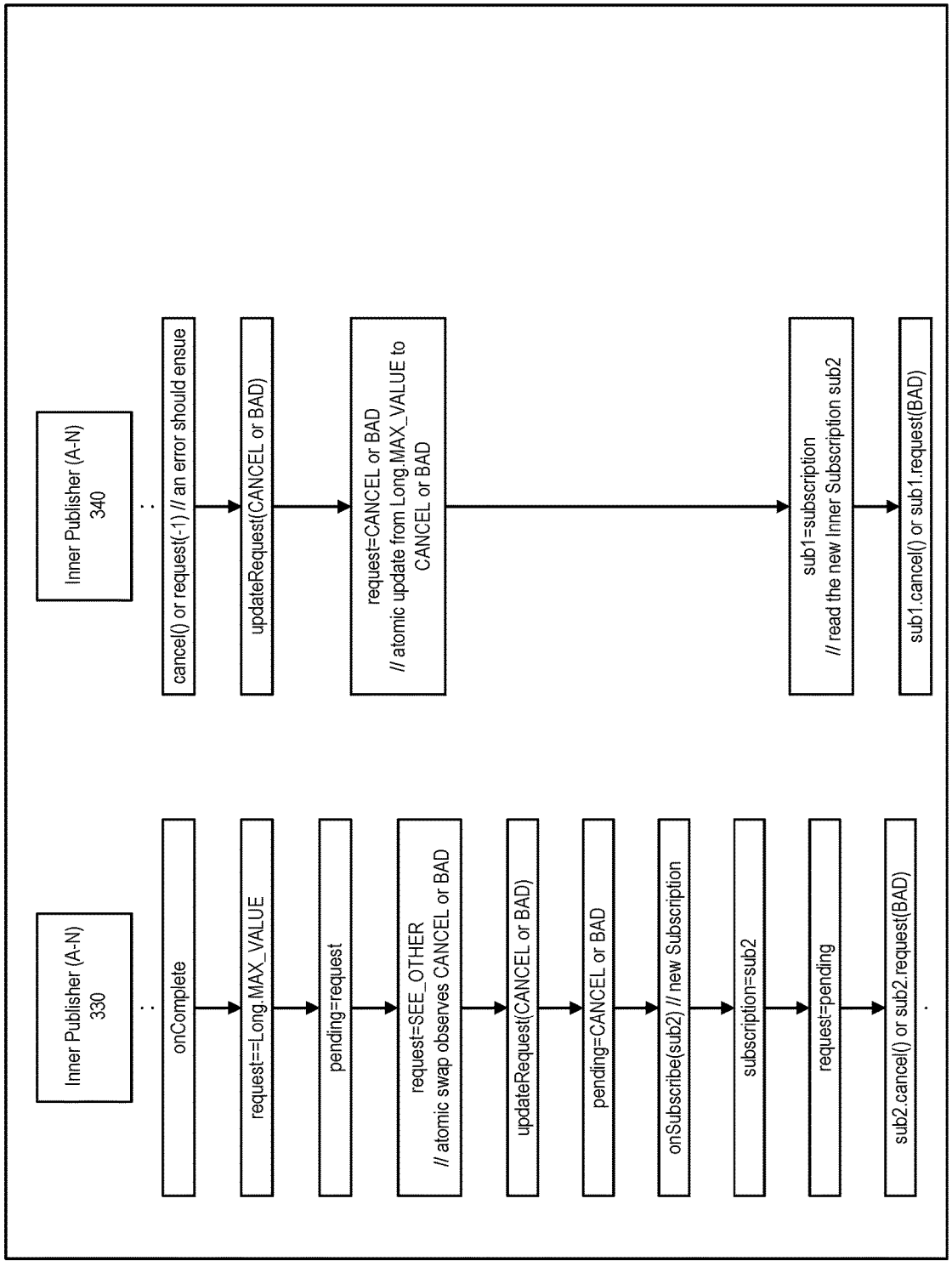
FIG. 13 illustrates an example of event processing, in accordance with an embodiment.

As illustrated in FIG. 13, in which the system issues a cancellation or invalid request on the same inner Subscription twice.

Figure 14:
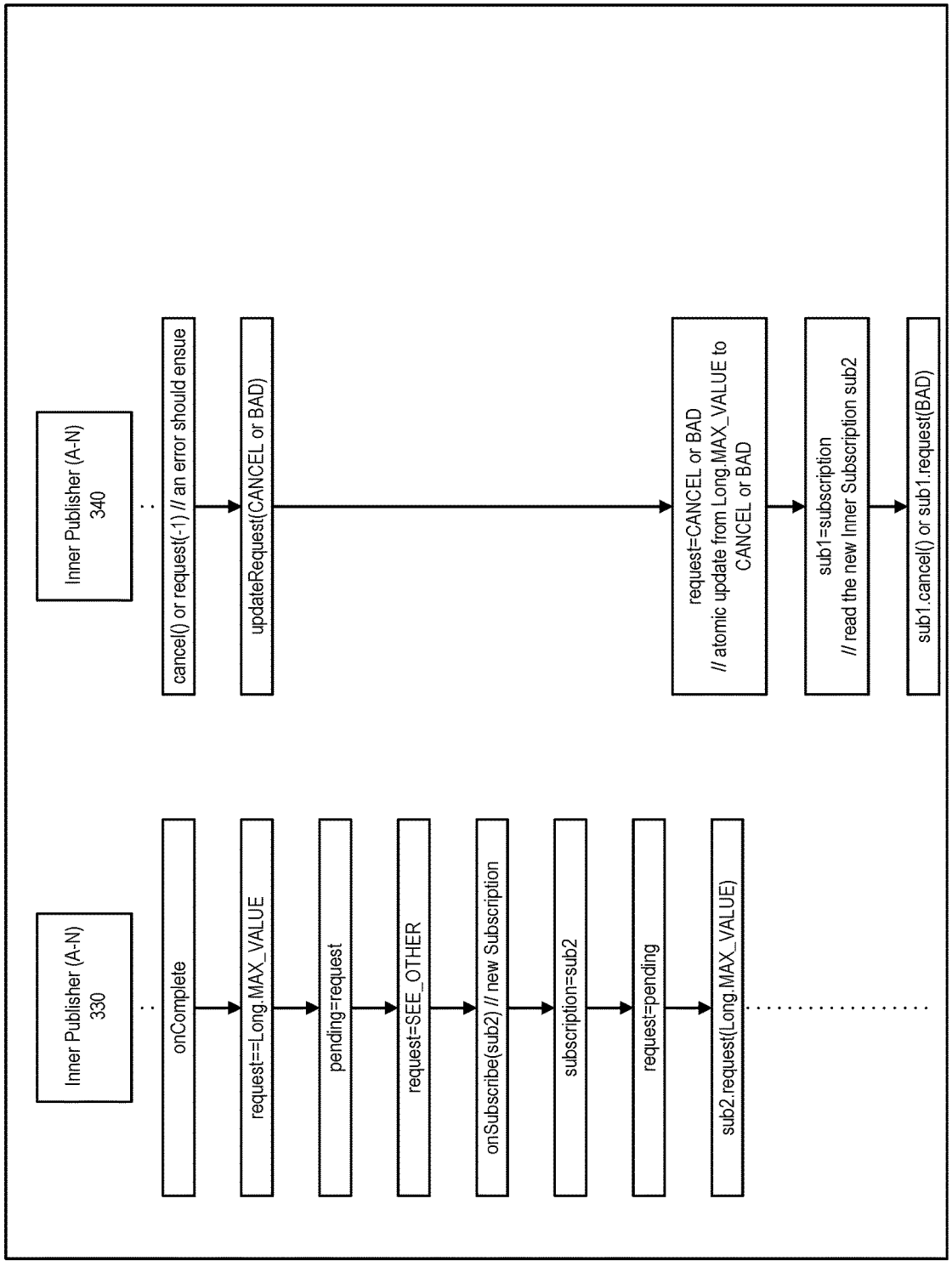
FIG. 14 illustrates an example of event processing, in accordance with an embodiment.

As illustrated in FIG. 14, in which the system issues a cancellation or invalid request concurrently with onSubscribe.

Figure 15:
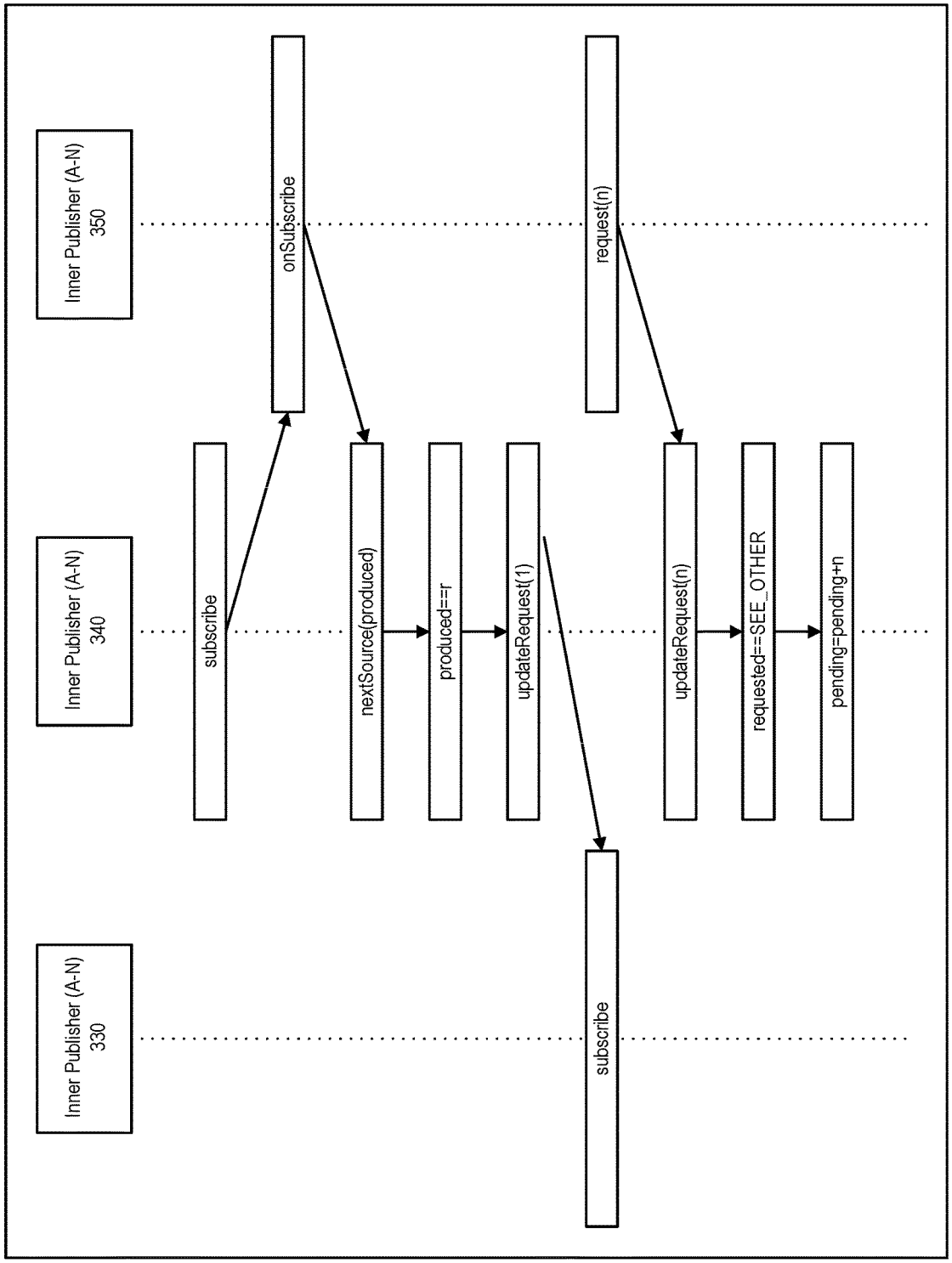
FIG. 15 illustrates an example of event processing, in accordance with an embodiment.

In accordance with an embodiment, FIG. 15 illustrates an environment in which—if request counter is updated for every new inner Subscription, the concurrent invocations of request( ) will be able to detect the change of inner Subscription—so they will either issue request( ) to the inner Subscription known to be in the terminated state (safe to carry over the requests to the next inner Publisher), or will observe the new inner Subscription (the routine setting the new Subscription can detect that such a update of request counter does not need carrying over).

Figure 16:
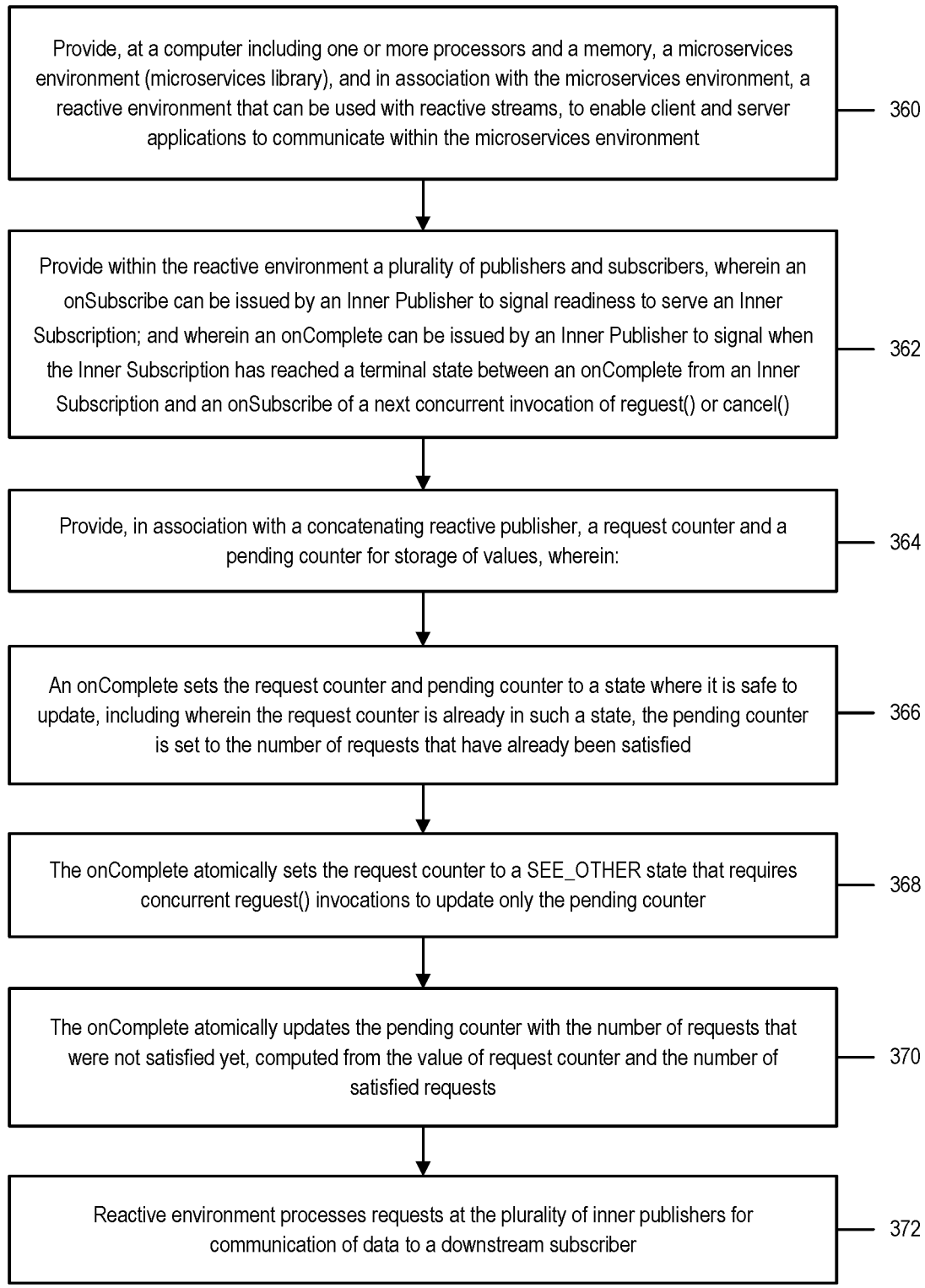
FIG. 16 illustrates a process for providing a constant memory footprint concatenating reactive publisher, in accordance with an embodiment.

FIG. 16 illustrates a process for providing a constant memory footprint concatenating reactive publisher, in accordance with an embodiment.

As illustrate in FIG. 16, in accordance with an embodiment, at step 360, a computer including one or more processors and a memory, and a microservices environment (microservices library), provides a reactive environment that can be used with reactive streams, to enable client and server applications to communicate within the microservices environment.

At step 362, provided within the reactive environment are a plurality of publishers and subscribers, wherein an onSubscribe can be issued by an inner Publisher to signal readiness to serve an inner Subscription; and wherein an onComplete can be issued by an inner Publisher to signal when the inner Subscription has reached a terminal state between an onComplete from an inner Subscription and an onSubscribe of a next concurrent invocation of request( ) or cancel( ).

At step 364, provided, in association with a concatenating reactive publisher, are a request counter and a pending counter for storage of values, wherein:

At step 366, an onComplete sets the request counter and pending counter to a state where it is safe to update, including wherein the request counter is already in such a state, the pending counter is set to the number of requests that have already been satisfied.

At step 368, the onComplete atomically sets the request counter to a SEE_OTHER state that requires concurrent request( ) invocations to update only the pending counter.

At step 370, the onComplete atomically updates the pending counter with the number of requests that were not satisfied yet, computed from the value of request counter and the number of satisfied requests.

At step 372, the reactive environment processes requests at the plurality of inner publishes for communication of data to a downstream subscriber.

In accordance with various embodiments, aspects of the present disclosure can include, for example:

In accordance with an embodiment, a system for providing a constant memory footprint concatenating reactive publisher, for use with a microservices or reactive programming environment, comprising:

a computer including one or more processors, that provides access to a microservices or other computing environment, for use with software applications;

wherein a publisher provides a subscriber with a subscription that supports requests of an amount up to a particular value; and wherein the system is adapted to extend a request range, together with a use of request counters to maintain necessary state and deliver requests as they are issued by the subscriber owning the subscription.

In accordance with an embodiment, a method for providing a constant memory footprint concatenating reactive publisher, for use with a microservices or reactive programming environment, comprising:

providing, at a computer including one or more processors, a microservices or other computing environment, for use with software applications;

wherein a publisher provides a subscriber with a subscription that supports requests of an amount up to a particular value; and extending a request range, together with a use of request counters to maintain necessary state and deliver requests as they are issued by the subscriber owning the subscription.

In accordance with an embodiment, a non-transitory computer readable storage medium, including instructions stored thereon which when read and executed by one or more computers cause the one or more computers to perform the steps comprising:

providing, at a computer including one or more processors, a microservices or other computing environment, for use with software applications;

wherein a publisher provides a subscriber with a subscription that supports requests of an amount up to a particular value; and extending a request range, together with a use of request counters to maintain necessary state and deliver requests as they are issued by the subscriber owning the subscription.

In accordance with various embodiments, the teachings herein may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the present teachings. Examples of such storage mediums can include, but are not limited to, hard disk drives, hard disks, hard drives, fixed disks, or other electromechanical data storage devices, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems, or other types of storage media or devices suitable for non-transitory storage of instructions and/or data.

The foregoing description has been provided for the purposes of illustration and description. It is not intended to be exhaustive or to limit the scope of protection to the precise forms disclosed. Many modifications and variations will be apparent to the practitioner skilled in the art.

For example, although various embodiments of the systems and methods described herein illustrate usage in a Helidon microservices environment, various embodiments can be used with other types of microservice environments or other computing environments.

The embodiments were chosen and described in order to best explain the principles of the present teachings and their practical application, thereby enabling others skilled in the art to understand the various embodiments and with various modifications that are suited to the particular use contemplated. It is intended that the scope be defined by the following claims and their equivalents.

What is claimed is:

1. A system for use with a reactive computing environment, for providing a constant memory footprint concatenating reactive publisher, comprising:
    a computer including one or more processors, that provides a reactive environment that supports the use of publishers, subscribers, and on-complete signals for use with microservices and software applications;
    wherein a publisher provides a downstream subscriber with a subscription that supports requests of an amount up to a particular value, including wherein an upstream publisher publishes data items via a plurality of inner publishers,
        wherein each inner publisher of the plurality of inner publishers is associated with an inner subscriber respectively,
        wherein each inner publisher provides its data via an inner subscription,
        wherein the plurality of inner publishers operate to provide the data items as a stream of events for use by the downstream subscriber; and
    wherein the system is adapted to use request counters to maintain a state and deliver the requests as they are issued by the subscriber owning the subscription, including
        wherein a request counter stores a value that is updated to indicate transitions between an output of a first inner publisher, and an output of a second inner publisher, in providing their data, and
        wherein a pending counter stores a value that is updated to indicate a number of requests from the downstream subscriber.

2. The system of claim 1, further comprising extending a request range, together with the use of the request counters, to maintain the state and deliver the requests as they are issued by the downstream subscriber owning the subscription.

3. The system of claim 1, wherein the value of the request counter is used by the system to indicate a transition between the plurality of inner publishers, and wherein the value of the pending counter is used by the system to keep track of the requests from the downstream subscriber.

4. The system of claim 1, wherein the reactive environment enables a client software application to communicate reactively with services, as publishers and subscribers, within a microservices environment.

5. The system of claim 1, wherein the reactive environment is provided within a cloud computing environment that provides access to one or more cloud, database, or other systems or services.

6. A method for use with a reactive computing environment, for providing a constant memory footprint concatenating reactive publisher, comprising:
    providing, at a computer including one or more processors, a reactive environment that supports the use of publishers, subscribers, and on-complete signals for use with microservices and software applications;
    wherein a publisher provides a downstream subscriber with a subscription that supports requests of an amount up to a particular value, including wherein an upstream publisher publishes data items via a plurality of inner publishers,
        wherein each inner publisher of the plurality of inner publishers is associated with an inner subscriber respectively,
        wherein each inner publisher provides its data via an inner subscription,
        wherein the plurality of inner publishers operate to provide the data items as a stream of events for use by the downstream subscriber; and
    using request counters to maintain a state and deliver requests as they are issued by the subscriber owning the subscription, including
        wherein a request counter stores a value that is updated to indicate transitions between an output of a first inner publisher, and an output of a second inner publisher, in providing their data, and wherein a pending counter stores a value that is updated to indicate a number of requests from the downstream subscriber.

7. The method of claim 6, further comprising extending a request range, together with the use of the request counters, to maintain the state and deliver the requests as they are issued by the downstream subscriber owning the subscription.

8. The method of claim 6, further comprising using the value of the request counter to indicate a transition between the plurality of inner publishers, and the value of the pending counter to keep track of the requests from the downstream subscriber.

9. The method of claim 6, wherein the reactive environment enables a client software application to communicate reactively with services, as publishers and subscribers, within a microservices environment.

10. The method of claim 6, wherein the reactive environment is provided within a cloud computing environment that provides access to one or more cloud, database, or other systems or services.

11. A non-transitory computer readable storage medium, including instructions stored thereon which when read and executed by one or more computers cause the one or more computers to perform the steps comprising:

providing, at a computer including one or more processors, a reactive environment that supports the use of publishers, subscribers, and on-complete signals for use with microservices and software applications;

wherein a publisher provides a downstream subscriber with a subscription that supports requests of an amount up to a particular value, including wherein an upstream publisher publishes data items via a plurality of inner publishers, wherein each inner publisher of the plurality of inner publishers is associated with an inner subscriber respectively, wherein each inner publisher provides its data via an inner subscription, wherein the plurality of inner publishers operate to provide the data items as a stream of events for use by the downstream subscriber; and using request counters to maintain a state and deliver requests as they are issued by the subscriber owning the subscription, including wherein a request counter stores a value that is updated to indicate transitions between an output of a first inner publisher, and an output of a second inner publisher, in providing their data, and wherein a pending counter stores a value that is updated to indicate a number of requests from the downstream subscriber.

12. The non-transitory computer readable storage medium of claim 11, further comprising extending a request range, together with the use of the request counters, to maintain the state and deliver the requests as they are issued by the downstream subscriber owning the subscription.

13. The non-transitory computer readable storage medium of claim 11, further comprising using the value of the request counter to indicate a transition between the plurality of inner publishers, and the value of the pending counter to keep track of the requests from the downstream subscriber.

14. The non-transitory computer readable storage medium of claim 11, wherein the reactive environment enables a client software application to communicate reactively with services, as publishers and subscribers, within a microservices environment.

15. The non-transitory computer readable storage medium of claim 11, wherein the reactive environment is provided within a cloud computing environment that provides access to one or more cloud, database, or other systems or services.

* * * * *

UNITED STATES PATENT AND TRADEMARK OFFICE
CERTIFICATE OF CORRECTION

PATENT NO. : 11,671,512 B2
APPLICATION NO. : 17/512319
DATED : June 6, 2023
INVENTOR(S) : Otenko It is certified that error appears in the above-identified patent and that said Letters Patent is hereby corrected as shown below:

In the Drawings

On sheet 9 of 16, in FIGURE 9, Line 17, delete "reguest()" and insert -- request() --, therefor.

On sheet 16 of 16, in FIGURE 16, under Reference Numeral 368, Line 2, delete "reguest()" and insert -- request() --, therefor.

In the Specification

In Column 6, Line 67, delete "accommodated" and insert -- accommodated. --, therefor.

In Column 7, Line 27, delete "requests" and insert -- requests. --, therefor.

In Column 8, Line 54, delete "signals" and insert -- signals. --, therefor.

In Column 9, Line 22, delete "state" and insert -- state. --, therefor.

In Column 9, Line 25, delete "counter" and insert -- counter. --, therefor.

In Column 9, Line 29, delete "requests" and insert -- requests. --, therefor.

In Column 11, Line 46, delete "request( )" and insert -- request( ), --, therefor.

Signed and Sealed this
Second Day of April, 2024

Katherine Kelly Vidal
*Director of the United States Patent and Trademark Office*